July 24, 1962 D. L. MARKUSEN ETAL 3,045,955
AIRCRAFT LANDING PROCESS AND APPARATUS
Filed Sept. 17, 1958 2 Sheets-Sheet 1
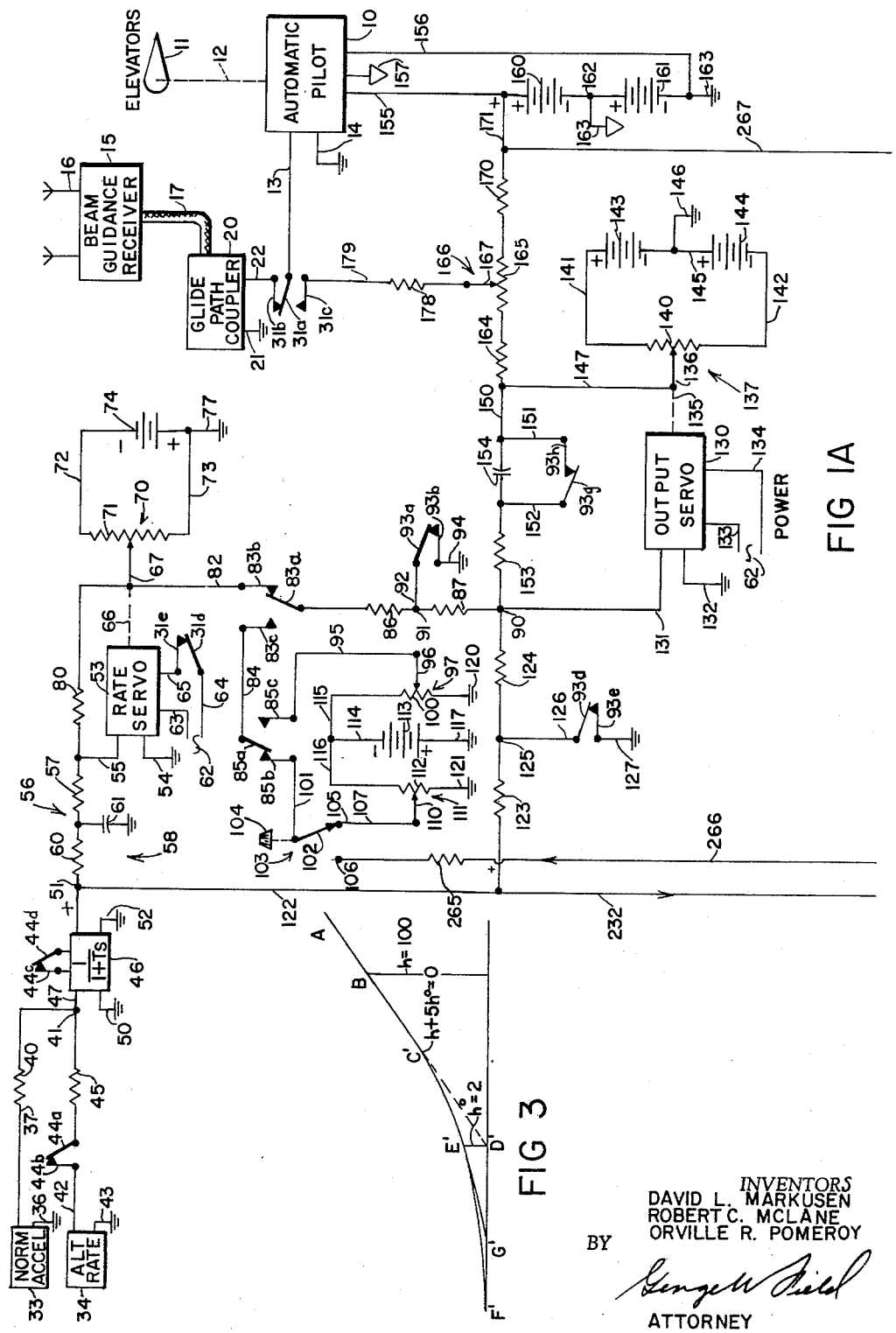
*INVENTORS*
DAVID L. MARKUSEN
ROBERT C. MCLANE
ORVILLE R. POMEROY
BY
ATTORNEY

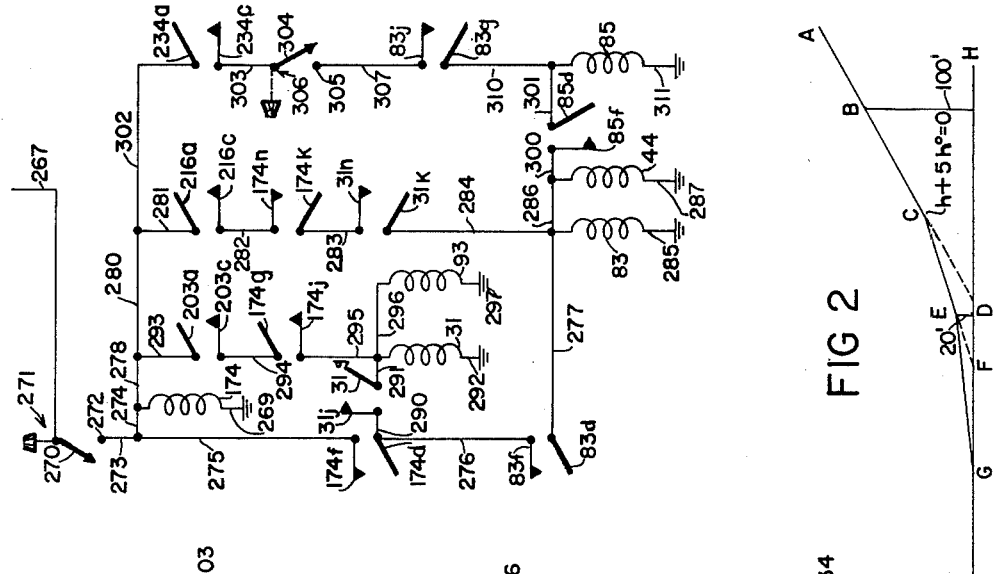

United States Patent Office 3,045,955
Patented July 24, 1962

3,045,955
AIRCRAFT LANDING PROCESS AND APPARATUS
David L. Markusen, Minneapolis, Robert C. McLane, St. Paul, and Orville R. Pomeroy, Minneapolis, Minn., assignors to Minneapolis-Honeywell Regulator Company, Minneapolis, Minn., a corporation of Delaware
Filed Sept. 17, 1958, Ser. No. 761,567
8 Claims. (Cl. 244—77)

This invention relates to the field of aviation, and more particularly to automatic landing apparatus for enabling aircraft to make safe, uneventful landings during periods of reduced visibility. For automatic landings it is necessary that the landing aircraft be controlled both in azimuth and in elevation: this invention is directed to control of the aircraft in elevation, and has for its object to provide improved means for flaring out the final approach of the aircraft, so that increased comfort and safety result by reason of reduced landing impact, without unduly increasing the required runway length.

A further object of the invention is to accomplish the improved elevation control by relying on a normal accelerometer as a signal source at low altitudes, where radio and pressure altimeters become undependable and where the radio glide path signals deteriorate.

Yet a further object of the invention is to include means for insuring that the transition, from normal glide path control to descent along the flare path, is made smoothly and simply, without the requirement that all aircraft must descend at the same air speed.

Various other objects, advantages, and features of novelty not particularly enumerated above, which characterize, the invention, are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

In the drawing FIGURES 1A and 1B together comprise a schematic wiring diagram of one embodiment of the invention which was found to operate successfully, and FIGURES 2 and 3 are illustrative of aircraft paths in elevation.

In FIGURE 1A reference numeral 10 identifies the portion of a conventional automatic pilot required to control the position of the elevators 11 of an aircraft through a mechanical connection 12. It is understood that automatic pilot 10 can include such displacement and rate gyroscopes, and such trim, centering, feedback, and command devices as the designer may consider desirable, together with electric, hydraulic, or pneumatic interconnections for making the system operative as a whole. Since the details of automatic pilot 10 form no part of the present invention, the automatic pilot is shown purely in block diagram form.

As is well known in the design of automatic pilots, the normal opration of unit 10 may be overridden by an external signal, so as to permit the aircraft to be maintained in a particular pattern of vertical flight. In FIGURE 1A this overriding control is brought about when a voltage appears between the conductor 13 and a ground connection 14. The normal use of this external circuitry is to permit the elevators of the aircraft to be controlled in accordance with the vertical output of a beam guidance receiver 15 having an antenna 16 for receiving glide path signals from a conventional ground installation, and a cable 17 which supplies the output of receiver 15 to a glide path coupler 20. Coupler 20 functions to convert the signal from receiver 15 into a form compatible with automatic pilot 10, and to supply it between a ground connection 21 and a conductor 22. In the normal condition of a relay presently to be described, conductors 22 and 13 are connected together, so that the output of the glide path coupler 20 is supplied to automatic pilot 10, and acts to cause the aircraft to follow the glide path beam of the instrument landing system.

The path in elevation of an aircraft using the equipment just described is shown in FIGURE 2 by the line ABCD. FIGURE 2 is illustrative and therefore is not drawn to scale: actually the line AD normally makes an angle of approximately 2½ degrees with the horizontal, but in FIGURE 2 the angles are exaggerated for purposes of illustration. It has been found that the impact of an aircraft with the ground when it follows the path ABCD is considerable and also that, because of idiosyncrasies of radio propagation, ground effects, etc., the radio signal received in the aircraft deteriorates as the ground is approached, so that for low altitude its reliability as a control signal for the aircraft is open to some question.

FIGURE 2 also shows the improved course which is followed by an aircraft using the present invention. At the point C the aircraft departs from the line AD, to descend at a smaller angle along the line CEF, and at the point E the aircraft again changes its direction of vertical travel, to follow the still more gently sloping line EG. By following this procedure, the aircraft will land with an impact which is measured by the angle EGF, whereas its impact was formerly measured by the angle ADH with the horizontal. At the same time the amount of runway required is increased only by the amount GD.

Another complication in automatic landing apparatus is illustrated in FIGURE 2, when it is realized that different aircraft are designed to land at different air speeds and that although two aircraft may follow the line ABC, their actual rates of descent with respect to the ground are not necessarily the same, but are determined by their air speeds. It is accordingly necessary that some means be devised for providing a smooth transition from glide path controlled flight at the point A to rate of descent controlled flight near the point C. This transition occurs at the point B, and is made free of troublesome transients by apparatus which determines the rate of descent of the aircraft during the portion AB of its descent, when it is controlled by the radio equipment, and thereafter during the portion BC of the descent causes the aircraft to continue to descend at the same rate, although the radio equipment has been cut off. Details of this arrangement will be given in connection with FIGURES 1A and 1B.

The changes in aircraft action which occur at points B, C, and E of FIGURE 2 are brought about under the control of sensing devices carried in the aircraft. Thus the change at point B is caused to take place when the aircraft is at an elevation of say 100 feet above the ground, and may conveniently be caused by a radio altimeter output. Similarly, the change that takes place at point E is preferably brought about when the altitude of the craft is 20 feet. The signal from a radio altimeter is sufficiently accurate for these switching functions. It has been decided somewhat arbitrarily that the change which takes place at point C should be brought about when the altitude of the aircraft becomes equal to five times its rate of descent, as is discussed more fully in connection with FIGURE 3. The altitude signal from the radio altimeter is satisfactory at this point, but such signals are frequently rather noisy at low altitudes, and it may be preferable to derive the altitude rate signal from some other device such for example as the barometric altimeter: although because of ground effects and the need for knowlege of the local pressure altitude the absolute value of the altitude signal from a barometric altimeter may be somewhat in error, the nature of the instrument is such that rate signals derived therefrom are substantially accurate.

It is to be realized that the operativeness of the invention is not dependent on the type of altitude or altitude rate sensing equipment which is used.

While the radio altimeter or altimeter is satisfactory for switching functions such as are performed at points B, C, and E, in FIGURE 2, it has been found that they do not have the accuracy desirable for actually controlling the craft along the line segments BCE and EG, for this reason it was found desirable to control the aircraft from signals derived from a normal accelerometer and suitable integrator. In FIGURE 1A the normal accelerometer is indicated by reference numeral 33 and the altitude rate signal source is indicated by reference 34, while in FIGURE 1B the altitude signal source is represented by the reference character 35.

Since nine different relays are used in this system, the following convention has been established for referring to them. Each relay is identified by a reference numeral applied to its winding, and the various movable and stationary contacts making up that relay are identified by the same reference numeral with different subscript letters. By this convention it becomes possible to put the windings and the contact sets at locations in the drawing best suited to illustrate the function of the apparatus, rather than having to bring them together at centralized locations and thus complicate the wiring diagram.

Conductor 13 in FIGURE 1A is connected to a movable relay contact 31a which normally engages a fixed relay contact 31b but may be actuated into engagement with a fixed relay contact 31c. Relay contact 31b is connected to conductor 22.

The means whereby a signal is supplied on relay contact 31c will now be explained. In the upper left-hand corner of FIGURE 1A normal accelerometer 33 is shown as supplying a signal between a ground connection 36 and a conductor 37, which signal is continuously representative of the acceleration to which the aircraft is subjected, measured parallel to the vertical axis of the aircraft. It has been found experimentally that the angular difference between the true vertical and the vertical axis of the aircraft is never sufficient during the process of automatic landing to introduce significant errors. The normal accelerometer output is supplied through a summing resistor 40 to a summation point 41. Altitude rate device 34 is shown as supplying between a ground connection 43 and a conductor 42 a signal representative of the rate of change of altitude of the aircraft. This signal is supplied through normally closed relay contacts 44b and 44a and a summing resistor 45 to summation point 41.

The signal between summation point 41 and ground is supplied as the input to a lag device 46 through a conductor 47 and a ground connection 50. Device 46 may be of any conventional construction, and may comprise a simple resistance-capacitance network, or a feedback amplifier type of arrangement, at the will of the designer. Normally closed relay contacts 44c and 44d are arranged to cooperate with device 46 in such a fashion that when the relay contacts are closed the time constant of the device has a first value, and when the relay contacts are open the time constant of the device has a second value. The transfer function of device 46 takes the form $$\frac{1}{1+Ts}$$

in one embodiment of the invention the time constant of device 46 was two seconds with relay contacts 44c and 44d engaged, and was twenty seconds with relay contacts 44c and 44d disengaged. The components of device 46 are so chosen, with respect to resistors 40 and 45 and the impedances of devices 33 and 34, that the gain for signals from device 33 differs by a constant multiplier from that for signals from device 34 when contacts 44c and 44d are in engagement. This constant multiplier is numerically equal to the value of the time constant of device 46, and in the preferred embodiment had a value of 2.

Device 46 supplies an output signal between an output terminal 51 and ground connection 52, which is supplied to a servo 53 through ground connections 52 and 54 and through a conductor 55 and a summing and filter network 56 made up of resistors 57 and 60 and capacitor 61. Power is supplied to servo 53 from any suitable source 62 through conductor 63 and through conductor 64, normally closed relay contacts 31d and 31e, and conductor 65. Servo 53 supplies a mechanical output indicator at 66, which is effective to displace the slider 67 of a voltage divider 70 along its winding 71, the winding being energized through conductors 72 and 73 from a voltage source shown to comprise a battery 74 the positive terminal of which is connected to a ground connection 77. Slider 67 is connected to the input of servo 53 through a feedback or summing resistor 80. From the foregoing structure it follows that slider 67 is positioned on winding 71 in accordance with the voltage between terminal 51 and ground, and accordingly a voltage equal to that at terminal 51 but of opposite polarity to ground is supplied along conductor 82 to a fixed relay contact 83b. Relay contact 83b is normally engaged by relay contact 83a, but the latter may be displaced into engagement with the fixed relay contact 83c, which is connected by a conductor 84 with movable relay contact 85a. This latter contact in turn normally engages relay contact 85b, but may be energized to disengage from relay contact 85b and to engage instead relay contact 85c. Movable relay contact 83a is connected through isolating resistors 86 and 87 to a second summation point 90. The common terminal 91 between resistors 86 and 87 may be grounded through conductor 92, normally engaged relay contacts 93a and 93b, and ground connection 94.

Relay contact 85c is connected by conductor 95 to the slider 96 of a voltage divider 97 having a winding 100. Relay contact 85b is connected through a conductor 101 to the movable contact 102 of a switch 103 which may be actuated by a knob 104: movable contact 102 normally engages a first fixed contact 105, but may be actuated to engage instead a second fixed contact 106. Fixed contact 105 is connected through conductor 107 to the slider 110 of a voltage divider 111 having a winding 112. Windings 100 and 112 of voltage dividers 97 and 111 are energized in parallel with negative voltage from a suitable source 113 of electrical energy which is shown as a battery, through conductors 114, 115 and 116, and ground connections 117, 120 and 121.

Terminal 51 is connected to summation point 90 through conductor 122 and isolating resistors 123 and 124. The common point 125 between resistors 123 and 124 may be grounded through conductor 126, normally engaged relay contacts 93d and 93c, and ground connection 127.

The voltage between summation point 90 and ground is supplied to an output servo 130 through a conductor 131 and a ground connection 132. Servo 130 is energized from source 62 through conductors 133 and 134, and actuates the mechanical drive indicated at 135 to displace the slider 136 of a voltage divider 137 with respect to the winding 140. Winding 140 is energized through conductors 141 and 142 from a source of electrical energy shown to comprise batteries 143 and 144 connected in series by a conductor 145, which is grounded at 146.

The voltage between slider 136 and ground is supplied to summation point 90 through conductor 147, 150, 151, normally closed relay contacts 93h and 93g, conductor 152, and feedback or summing resistor 153. When relay contacts 93g and 93h become disengaged, a capacitor 154 is inserted between resistor 153 and conductor 150, to convert output servo 130 to an integrator. The word "integrator" as used in the claims, is intended to be broad enough to cover both a pure integrator, in which resistor 153 would be omitted, and the arrangement shown, which gives a "proportional plus inntegral" output. (See page 207 of "Principles of Servomechanisms," by Brown and Campbell, fourth publication, 1950, John Wiley & Sons.)

A detail of construction peculiar to the particular embodiment of the invention which was tested is shown in the lower right-hand portion of FIGURE 1A. It will be seen that the electrical energy for the sensing units of automatic pilot 10 is supplied on conductors 155 and 156 and return connection 157 from a pair of series connected aircraft batteries 160 and 161, having a common point 162. Battery 161 is grounded as indicated at 163. Thus the autopilot signals vary around a central zero value which is displaced by the voltage of battery 161 from the aircraft ground indicated at 163. The output signal from applicant's flare-out system, on the other hand, appears between slider 136 and ground connection 146. In order to compensate for this difference and make accurate centering of the various pieces of equipment possible, a voltage divider is connected between slider 136 and positive conductor 155. This voltage divider includes conductor 147, fixed resistor 164, the winding 165 of a voltage divider 166 having a slider 167, fixed resistor 170, and conductor 171. It will be appreciated that the power grounds indicated at 157 and 163 are electrically isolated from the signal grounds shown throughout the drawing by the other ground symbol.

Turning now to FIGURE 1B, altimeter 35 is shown to supply between a ground connection 172 and a conductor 173 a signal determined by the altitude of the aircraft. This signal is supplied to fixed relay contact 174c, which may be engaged by movable relay contact 174a when it is displaced from normal engagement with relay contact 174b. A source of voltage shown as a battery 175 having its negative terminal grounded at 176 is connected by conductor 177 and ground connection 178 to a voltage divider made up of resistors 179 and 180 having a common terminal 181 connected by conductor 182 to relay contact 174b.

The voltage between movable relay contact 174a and ground is supplied to the input of an altitude servo 183 through summing resistor 184, conductor 185, and ground connection 186. Altitude servo 183 is energized from source 62 through conductors 187 and 188. Servo 183 acts through a mechanical connection 189 to displace the slider 190 of a voltage divider 191 with respect to the winding 192, which is energized through conductors 193 and 194 from a source of electricity shown to comprise a battery 195 the positive terminal of which is grounded at 196. Slider 190 is connected to input conductor 185 through conductors 197 and 198 and summing resistor 199.

FIGURE 1B shows a plurality of relay control amplifiers 200, 201 and 202, which may conveniently be of identical construction. Amplifier 200 energizes the winding of relay 203 through conductors 204 and 205, when the voltage between ground connection 206 and an input terminal 207 reaches a particular value. This particular value is determined by the setting of the slider 210 of a voltage divider 211 energized from a suitable source of voltage so connected that the slider is always positive with respect to a ground connection 212. Terminal 207 is connected to slider 210 through a summing resistor 213, and to slider 190 through conductors 197 and 214 and a summing resistor 215.

Amplifier 201 energizes relay winding 216 through conductors 217 and 220 when the voltage between ground connection 221 and an input terminal 222 reaches a particular value. The value is determined by the setting of the slider 223 of a voltage divider 224 whose winding is energized from a suitable source of voltage so that the slider is always positive with respect to a ground connection 225. Slider 223 is connected to terminal 222 through summing resistor 226 and conductor 227. Slider 190 is connected to terminal 222 through conductors 197, 214 and 230, resistor 231, and conductor 227. Terminal 51 of FIGURE 1A is connected through conductors 122 and 232 and summing resistor 233 to terminal 222.

Amplifier 202 energizes relay 234 through conductors 235 and 236 when the voltage between the ground connection 237 and a terminal 240 reaches a particular value. The particular value is determined in accordance with the position of the movable contact 241 of a single pole double throw switch 242 which may engage either fixed contact 243 or 244: movable contact 241 is connected to terminal 240 through summing resistor 245. When switch 242 is in the position shown, the voltage at which relay 234 operates is determined by a voltage divider 246 which is energized from a suitable source so that the slider 247 of the voltage divider is always maintained positive with respect to ground connection 250. Slider 247 is connected to switch contact 244 by conductor 251. When switch contact 241 engages switch contact 243, the energization of relay 234 is controlled by voltage divider 252 which is energized from a suitable source of voltage so that the slider 253 is always maintained negative with respect to ground connection 254. Slider 253 is connected with switch contact 243 by conductor 255.

Terminal 240 is connected through resistor 256 to the movable contact 257 of a further switch 260 having fixed contacts 261 and 262. Switch contact 262 is connected through conductors 263, 230, 214 and 197 to slider 190. Switch contact 261 is connected through conductors 264, 232, and 122 to terminal 51 of FIGURE 1A.

Switch contact 106 of FIGURE 1A is connected through summing resistor 265 and conductors 266, 214 and 197 to slider 190 of FIGURE 1B.

Switch 103 of FIGURE 1A and switches 242 and 260 of FIGURE 1B are preferably arranged for simultaneous operation, and constitute a mode switch. Operation of the system when the mode switch is in the position shown is in accordance with FIGURE 2, while if the switch is moved into its other position, operation of the system is in accordance with FIGURE 3, which will be described below.

The energizing circuits for relays 31, 44, 83, 85, 93, and 174 of FIGURE 1B will now be traced. The positive terminal of the aircraft battery shown in FIGURE 1A is connected through conductors 171 and 267 to the movable contact 270 of a single pole single throw switch 271 shown in FIGURE 1B to have a fixed contact 272. Relay winding 174 may be energized from a switch contact 272 through conductors 273 and 274, the circuit being completed through ground connections 269 and 163.

Relay 83 may be energized from switch contact 272 through conductor 275, normally open relay contacts 174f and 174d, conductor 276, normally open relay contacts 83f and 83d, and conductor 277, or through conductors 273, 274, 278, 280, and 281, normally open relay contacts 216a and 216c, conductor 282, normally open relay contacts 174n and 174k, conductor 283, normally open relay contacts 31n and 31k, and conductor 284, the circuit being completed through ground connections 285 and 163.

Relay 44 is connected in parallel with relay 83 by conductor 286 and ground connection 287, for operation simultaneously therewith.

Relay 31 may be energized from switch contact 272 either through conductors 273 and 275, normally open relay contacts 174f and 174d, conductor 290, normally open relay contacts 31j and 31g, and conductor 291, or through conductors 273, 274, 278, and 293, normally open relay contacts 203a and 203c, conductor 294, normally open relay contacts 174g and 174j, and conductor 295, the circuit being completed through ground connections 292 and 163.

Relay 93 is connected in parallel with relay 31 by conductor 296 and ground connection 297, for operation simultaneously therewith.

Relay 85 may be energized from switch contact 272 through three different paths. The first path includes conductors 273 and 275, normally open relay contacts 174f and 174d, conductor 276, normally open relay contacts 83f and 83d, conductors 277, 286 and 300, normally open relay contacts 85f and 85d, and conductor 301. The second path includes conductors 273, 274, 278, 280, and 281, normally open relay contacts 216a and 216c, conductor 282, normally open relay contacts 174n and 174k, conductor 283, normally open relay contacts 31n and 31k, conductors 284, 286 and 300, normally open relay contacts 85f and 85d, and conductor 301. The third path includes conductors 273, 274, 278, 280 and 302, normally open relay contacts 234a and 234c, conductor 303, movable contact 304 and fixed contact 305 of a switch 306, conductor 307, normally open relay contact 83j and 83g, and conductor 310. The circuit in each case is completed through ground connections 311 and 163.

*Operation*

In the initial condition of the system the relays are in the position shown in FIGURES 1A and 1B, as are switches 270, 103, 242, and 260. Source 62 is energized, the automatic pilot 10 is in operation, as are the beam guidance receiver 15 and the glide path coupler 20. Switch 306 is closed. The aircraft is following the localizer beam at substantially constant altitude, and has not yet reached the intersection of the localizer beam with the glide path beam.

Slider 167 is set so that, with zero voltage on slider 136 with respect to ground connection 146, there is no voltage between slider 167 and automatic pilot ground connection 14.

Sliders 96, 110, 210, 223, 247, and 253 have been preset at values which were found to give the operation which will be described below.

Under the conditions outlined above, devices 33, 34, and 35 are giving outputs which are representative of normal acceleration, altitude rate, and altitude respectively: the first two are substantially zero, and the latter is constant. The input to altitude servo 183 of FIGURE 1B through summing resistor 184 is fixed. The ratio of resistances of resistors 179 and 180 is selected to give a voltage on conductor 182 which is the same as that given by device 35 when an aircraft is at a standard approach altitude. The voltage on resistor 184 and that supplied by slider 190 are the only inputs to servo 183, which accordingly adjusts slider 190 to a predetermined position in which the two voltages are equal and opposite. A standard voltage is thus supplied from slider 190 to relay control amplifiers 200, 201 and 202, but since this voltage is considerably greater than those supplied by sliders 210, 223, and 247, no relay operation is brought about.

In FIGURE 1A, because of relay contacts 93a and 93b, 93d and 93e, and 93g and 93h, the only input supplied to output servo 130 is that from slider 136. The servo accordingly adjusts the slider to a position in which it is at the same potential as ground connection 146, thus reducing the output of the system to zero.

At this point the human pilot has a choice of whether to make a normal glide path landing, or whether to use a flared out final approach. The first of these choices requires no further activity on his part, but if he makes the second choice, he closes switch 270 of FIGURE 1B, energizing relay 174. Relay contacts 174a, 174b, and 174c operate to substitute altitude responsive device 35 as the input to altitude servo 183. If the aircraft is not at the standard altitude for which resistors 179 and 180 were selected, a signal is applied to the input of altitude servo 183, and slider 190 is adjusted to a position determined by the actual altitude of the aircraft and any subsequent change in the altitude of the craft further changes the input signal to servo 183: the result is that a signal appears on conductor 214 which is determined in magnitude by the altitude of the aircraft, and this signal is supplied through summing resistors 215, 231 and 246 to relay control amplifiers 200, 201 and 202.

Operation of relay 174 also completes certain preparatory circuits for other control relays. Thus relay contacts 174g and 174j prepare the operating circuit for relays 31 and 93, relay contacts 174d and 174f prepare the holding circuits for relays 31 and 93 and for relays 83 and 44; and relay contacts 174k and 174n prepare in part the operating circuit for relays 44 and 83.

After the human pilot has closed switch 270 the instrument landing flight is continued, glide path control being begun either automatically or manually when the glide path beam is intersected. The aircraft begins to descend along the glide slope path, and when transients have subsided it is moving with a constant rate of descent and a zero normal acceleration. It is to be noted that at this time the actual altitude of the aircraft is of the opposite sense to the altitude rate, because the aircraft is descending. A positive altitude is arbitrarily represented on conductor 214 by a negative voltage, and consequently a negative altitude rate appears at terminal 51 as a positive voltage. If any acceleration is present it is sensed by accelerometer 33, its effect at terminal 51 is positive if the acceleration acts downwardly, and negative if the acceleration acts upwardly.

The nature of the circuitry including lag device 46 can be explained briefly as follows, using conventional servo theory terminology. The output of device 34 is $sh$ and that of device 33, neglecting the slight angle between "normal" and true vertical, is $s^2h$, where $h$ is altitude and $s$ is the Laplace operator. These outputs are summed at 41, through summing resistors which have different values giving the second signal an effective gain of T compared to the first signal, so that a total signal appears of value $(sh+Ts^2h)$, and the signal at 51, on the other side of device 46, is accordingly $$(sh+Ts^2h)\left(\frac{1}{1+Ts}\right) \quad (1)$$

Expanding gives $$\frac{sh}{1+Ts}+\frac{Ts^2h}{1+Ts} \quad (2)$$

factoring gives $$\left(\frac{1}{1+Ts}+\frac{Ts}{1+Ts}\right) \quad (3)$$

and combining terms gives $$sh\left(\frac{1+Ts}{1+Ts}\right) \quad (4)$$

Since the fraction has the same numerator and denominator, its value is 1, and Expression 1 is thus shown to have the value $sh$, which is true for all frequencies.

The altitude rate so computed is superior to the simple output from device 34 taken alone, in that high frequency noise, which is present at 34, is suppressed by device 46. This principle is discussed in more detail in the co-pending McLane application, filed December 7, 1956, Serial No. 577,877, assigned to the assignee of the present application.

The components making up device 46 are so chosen that T in device 46 has the same value as T due to the selection of resistors 40 and 45.

The constant signal at terminal 51 is supplied to rate servo 53, and results in adjustment of slider 67 to a point where the signal fed back through resistor 80 is equal and opposite to that supplied through resistor 57. Accordingly, an output signal is supplied to relay contact 83b which is representative of the rate of descent of the aircraft, and which varies with variations in that rate. This is of course true regardless of the air speed of the aircraft, so that the apparatus can be used in any aircraft and does not require all aircraft to descend at the same air speed, which would be a serious limitation on the utility of the apparatus.

The aircraft is now moving along the line AB of FIGURE 2. When the point B is reached at which the aircraft is at a predetermined altitude, preferably 100 feet, the signal supplied to amplifier 200 of FIGURE 1B through resistor 215 becomes equal to that supplied through resistor 213, and relay 203 is energized. This completes at contacts 203a and 203c the energizing circuit for relays 31 and 93, and these relays pull in. Relay contacts 31g and 31j complete a holding circuit for these relays, and relay contacts 31k and 31n complete the preparatory circuit for relays 44 and 83. Relay contacts 31d and 31e, FIGURE 1B, open to cut off power from rate servo 53, so that no further movement of slider 67 can take place, regardless of any change in the voltage at terminal 51. Relay contacts 93a and 93b open to unground terminal 91, and relay contacts 93d and 93e open to unground terminal 125, so that the signal at relay contact 83b and the signal at terminal 51 are both transmitted to output servo 130, for determining the adjustment of slider 136. Relay contacts 93g and 93h open to connect the capacitor 154 in the feedback circuit for servo 130, converting the servo to an integrator.

It must be appreciated that the input to servo 130 is zero as long as the aircraft continues to descend at the rate at which it was descending when relay contacts 31d and 31e cut off the supply of power from servo 53, and that the signal supplied by slider 136 varies only if the altitude rate changes to change the signal at terminal 51. Since relay 31 has been energized, relay contacts 31a and 31b, and 31c operate to disconnect automatic pilot 10 from glide path coupler 20, and to connect the autopilot instead to slider 167 for control in accordance with the flare out coupler signal. The aircraft now proceeds along the line BC of FIGURE 2, which is a continuation of the line AB.

When the craft reaches the point C of FIGURE 2, its actual altitude has descreased to the point where the signal supplied to relay control amplifier 201 through resistor 231 is equal and opposite to the signal supplied through resistors 233 and 226, the former of these being representative of rate of descent of the aircraft. Relay 216 is energized, and acts through relay contacts 216a and 216c to energize relays 83 and 44. Relay contacts 83d and 83f complete the holding circuit for relays 83 and 44, and relay contacts 83g and 83j close to complete the preparatory circuit for relay 85. Relay contacts 44a and 44b open to cut off altitude rate device 34 from lag device 46, and relay contacts 44c and 44d open to change the time constant in the device. In a preferred embodiment of the device this change was from a time constant of two seconds to a time constant of twenty seconds.

Relay contacts 83a, 83b and 83c disconnect output servo 130 from slider 67 and connect it instead through conductor 84 and relay contacts 85a and 85b to slider 110 of voltage divider 111. Slider 110 has been set so that its voltage differs from that supplied by slider 66, and since the rate of the aircraft is not appreciably changed in the interval of operation of the relay, a step voltage is supplied to output servo 130, causing movement of slider 136 to change the signals supplied through slider 167 to automatic pilot 10, and thus change the elevator settings of the aircraft. The aircraft assumes a new rate of descent by which the signal at terminal 90 supplied from terminal 51 is equal and opposite to that at terminal 90 supplied from slider 110. When this condition is reached, output servo 130 ceases to cause operation of slider 136, and the aircraft continues in descent at the new fixed rate, along the line CE of FIGURE 2.

When the aircraft reaches the point E the signal supplied to amplifier 202 through resistor 256 becomes equal to that supplied through resistor 245 from slider 247, and relay 234 pulls in, completing the circuit for relay 85 through switch 306. Relay 85 completes its own holding circuit through relay contact 85d and 85f, and also acts at relay contacts 85a, 85b, and 85c to substitute the voltage on slider 96 for the voltage on slider 110, and a second step voltage is applied to output servo 130. Slider 136 is displaced to a new position, in the same manner as just described, and the aircraft continues along the line EG until it makes contact with the landing strip.

Switch 306 is provided to give the human pilot an additional option in landing procedure. If he desires to shorten the amount of runway required for the landing, he may open switch 306, thus preventing operation of relay 85 when relay contacts 234a and 234c close. The aircraft then follows the line CEF of FIGURE 2, and touches down on the runway sooner but less gently than it would if it followed the doubly flared path.

The purpose of switch 103 will now be described, referring to FIGURE 3 which shows the vertical path of an aircraft similar to that shown in FIGURE 2. In FIGURE 3 the aircraft is controlled to follow the ILS glide path along the portion AB, and to continue at the same rate of descent along the portion BC'; as before, the point B occurs at an altitude of 100 feet, and the point C' occurs when the relationship between the altitude and rate of descent of the aircraft is given by the expression of $h+5\dot{h}=0$. At this point C', however, there is substituted for the straight line descent C'D' an exponential descent indicated by the path C'E'F'.

If the human pilot desires to descend according to this path, he moves switch 103 so that movable contact 102 engages fixed contact 106. Then when the aircraft reaches the point C' and relays 83 and 44 are energized, as previously described, there is substituted for the voltage on slider 67 the voltage on terminal 106 of switch 103, for combination with the voltage at terminal 51 as an input to servo 130. The signal on terminal 51 represents altitude rate, and the signal on switch contact 106 represents altitude, and output servo 130 operates as an integrator until the change in elevator position resulting from adjustment of slider 136 is such that an exponential relationship between the rate of descent of the aircraft and its altitude is achieved. As described more fully in the co-pending applicatoin of McLane and Pomeroy, filed December 7, 1956, Serial No. 626,936, and assigned to the assignee of the present application, this arrangement results in descent at a decreasing rate to a very gentle contact with the runway.

One further option is available to the human pilot. If with switch 103 operated into the position not shown in FIGURE 1A, the human pilot closes switch 306, relay 85 can again be energized. This takes place when the altitude rate signal to amplifier 202 supplied through switch contacts 261 and 257 and summing resistor 256 becomes equal and opposite to the standard signal supplied through resistor 245, switch contacts 241 and 243, and conductor 255 from slider 253, and occurs when the altitude rate of the aircraft becomes equal to about minus two feet per second. When this occurs and relay 85 is operated, slider 96 is substituted for switch contact 102 and the source for a comparison voltage for servo 130, and the same type of straight line descent is again commanded as was commanded in the first described system. The aircraft now follows that path shown in FIGURE 3 by the letters ABC'E'G'.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shapes, size and arrangement of parts, within the principle of the invention, to the full extent indicated by the broad general meaning of the terms in which the appended claims are expressed.

We claim as our invention:

1. Apparatus of the class described comprising, in combination: means for giving a first signal determined by the departure of an aircraft from a downwardly sloping radio beam; means for giving a second signal determined by the rate of descent of the aircraft; means for giving a third signal determined by the normal acceleration of the aircraft; means for giving a fourth signal determined by the altitude of the aircraft; a first time element giving a lagged signal determined by the input thereto and having an adjustable time constant; control means connected to said time element for giving an output determined by said lagged signal; an integrator giving an output which is an integral function of its input; further means for supplying first and second comparison signals, of which at least one is of settably fixed values; switch means having a first condition, a second condition, a third condition, and a fourth condition; and means connecting said switching means to receive said fourth signal and said lagged signal for causing said switching means to change from said first condition to said second condition when said fourth signal decreases to a first predetermined value, from said second condition to said third condition when said fourth signal decreases to have a predetermined relation to said lagged signal, and from said third condition to said fourth condition when said fourth signal decreases to a second predetermined value.

2. Aircraft apparatus comprising, in combination: means giving a first signal normally representative of the altitude rate of an aircraft; means giving a second signal representative of the normal acceleration of the aircraft; a lag network having an adjustable time constant; an adjustable signal generator; and switching means connected to said generator and to both said means, and having a first operative condition, in which said network is adjusted to have a short time constant and in which said first and second signals are connected through said network to cause adjustment of said generator so that its output is synchronized with the vertical movement of the aircraft, and a second operative condition, in which said network is adjusted to have a long time constant and adjustment of said generator is prevented, and in which said second signal only is connected through said network and combined with the output of said generator.

3. In combination: means giving a first signal normally representative of the rate of movement of a body with respect to a surface; means giving a second signal representative of the acceleration of the body in a direction substantially normal to said surface; a lag network having an adjustable time constant; an adjustable control signal generator; and switching means connected to said generator and to both said means, and having a first operative condition, in which said network is adjusted to have a short time constant and in which said first and second signals are connected through said network to cause adjustment of the output of said signal generator to an initial value, and a second operative condition, in which said network is adjusted to have a long time constant and adjustment of said generator is prevented, and in which only said second signal is connected through said network to supply an output and combined with the initial value output of said generator to give a resultant signal.

4. In combination: means giving a first signal nominally representative of the first derivative of a variable quantity; means giving a second signal substantially representative of the second derivative of said variable quantity; a lag element having an adjustable time constant; an adjustable signal generator; and operating means connected to said lag element and to both said means, and having a first condition, in which said element is adjusted to have a short time constant and in which said first and second signals are supplied through said element to cause adjustment of said generator so that its output is synchronized with changes in said variable quantity, and a second condition, in which said element is adjusted to have a long time constant and adjustment of said generator is prevented, and in which said second signal only is supplied through said element and combined with the output of said generator to comprise a resultant signal.

5. Apparatus of the class described comprising, in combination: first condition responsive means for giving a first output determined by the departure of an aircraft from a downwardly sloping linear path; signal responsive means for controlling the aircraft about the pitch axis thereof; second condition responsive means for giving a second output determined by the rate of descent of the aircraft; first adjustable output means; means normally adjusting said adjustable means in accordance with said second output; means normally connecting said signal responsive means to said first condition responsive means; second adjustable output means; third condition responsive means for giving a third output determined by the altitude of the aircraft; and means connected to said third condition responsive means, to both said output means, and to said signal responsive means and operative when the aircraft reaches a predetermined altitude to interrupt adjustment of said first adjustable means, to initiate adjustment of said second adjustable means as a time function of the relation between said second output and the output of said first adjustable means, and to substitute the output of said second adjustable means for said first output as the signal to said signal responsive means.

6. Apparatus of the class described comprising, in combination: first condition responsive means for giving a first output determined by the departure of an aircraft from a downwardly sloping linear path; signal responsive means for controlling the aircraft about the pitch axis thereof; second condition responsive means for giving a second output determined by the rate of descent of the aircraft; first adjustable output means; means normally adjusting said adjustable means in accordance with said second output; means normally connecting said signal responsive means to said first condition responsive means; second adjustable output means; third condition responsive means for giving a third output determined by the altitude of the aircraft; and means connected to said third condition responsive means, to both said output means, and to said signal responsive means and operated when the aircraft reaches a predetermined altitude to interrupt adjustment of said first adjustable means, to initiate adjustments of said second adjustable means as a function of the relation between said second output and the output of said first adjustable means, and to substitute the output of said second adjustable means for said first output as the signal to said signal responsive means.

7. In combination: means giving a lagged signal representative of the vertical acceleration of an aircraft; means giving a signal representative of a desired rate of descent of the aircraft; signal responsive apparatus for controlling the aircraft about the pitch axis thereof; an integrator;

connecting means supplying both said signals to said integrator as inputs therefor; and means connecting the resulting output of said integrator to said signal responsive means.

8. In combination: means giving a signal representative of the vertical acceleration of an aircraft; means giving a signal representative of a desired rate of descent of the aircraft; signal responsive apparatus for controlling the aircraft about the pitch axis thereof; an integrator; connecting means supplying both said signals to said integrator as inputs therefor; and means connecting the resulting output of said integrator to said signal responsive means.

References Cited in the file of this patent
UNITED STATES PATENTS

| | | |
|---|---|---|
| 2,830,291 | Hecht | Apr. 8, 1958 |
| 2,841,345 | Halpert | July 1, 1958 |